United States Patent
Bellino et al.

(10) Patent No.: US 6,352,193 B1
(45) Date of Patent: Mar. 5, 2002

(54) APPARATUS FOR JOINING ELECTRICALLY CONDUCTIVE MATERIALS

(75) Inventors: Joseph P. Bellino, Simsbury; Michael J. Caulfield, Essex, both of CT (US); Steven E. Richard, Selmer, TN (US); Jerry E. Gould; Timothy V. Stotler, both of Columbus, OH (US); Karen Lausier, Terryville, CT (US); Mathew D. Skiliter, Columbus; Mark Hunt, Hilliard, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/629,387

(22) Filed: Aug. 1, 2000

(51) Int. Cl.[7] .................. B23K 20/12; B23K 37/00; B23K 31/02
(52) U.S. Cl. ...................... 228/112.1; 228/2.1
(58) Field of Search .................. 228/112.1, 2.1, 228/114, 114.5

(56) References Cited

U.S. PATENT DOCUMENTS

| | | | | |
|---|---|---|---|---|
| 5,460,317 A | * | 10/1995 | Thomas et al. | 228/112.1 |
| 5,611,479 A | * | 3/1997 | Rosen | 228/112.1 |
| 5,697,511 A | | 12/1997 | Bampton | 220/4.12 |
| 5,697,544 A | * | 12/1997 | Wykes | 228/2.1 |
| 5,713,507 A | | 2/1998 | Holt et al. | 228/112.1 |
| 5,718,366 A | * | 2/1998 | Colligan | 228/112.1 |
| 6,138,895 A | * | 6/1998 | Oelgoetz et al. | 228/112.1 |
| 6,045,028 A | * | 7/1998 | Martin et al. | 228/112.1 |
| 5,794,835 A | * | 8/1998 | Colligan et al. | 228/2.1 |
| 6,213,379 B1 | * | 8/1998 | Takeshita et al. | 228/112.1 |
| 5,813,592 A | * | 9/1998 | Midling et al. | 228/112.1 |
| 5,829,664 A | | 11/1998 | Spinella et al. | 228/112.1 |
| 5,893,507 A | | 4/1999 | Ding et al. | 228/2.1 |
| 6,029,879 A | * | 2/2000 | Cocks | 228/2.1 |
| 6,053,391 A | * | 5/2000 | Heideman et al. | 228/2.1 |
| 6,206,268 B1 | * | 7/2000 | Mahoney | 228/112.1 |
| 6,227,430 B1 | * | 5/2001 | Rosen et al. | 228/2.1 |

FOREIGN PATENT DOCUMENTS

| | | | |
|---|---|---|---|
| EP | 0 615 480 B1 | 11/1995 | |
| EP | 0 797 043 A2 | 9/1997 | |
| EP | 0 810 054 A1 | 12/1997 | |
| EP | 0 810 055 A1 | 12/1997 | |
| EP | 0 810 056 A2 | 12/1997 | |
| EP | 0810056 A2 * | 12/1997 | 228/112.1 |
| EP | 0 752 926 B1 | 5/1998 | |
| EP | 0 867 254 A1 | 9/1998 | |
| EP | 0 888 843 A1 | 1/1999 | |
| EP | 0 893 189 A2 | 1/1999 | |
| EP | 0 893 190 A2 | 1/1999 | |
| EP | 0 925 964 A2 | 1/1999 | |
| EP | 0 928 659 A1 | 7/1999 | |
| GB | 2 306 366 A | 7/1997 | |
| GB | 2 320 218 A | 6/1998 | |
| GB | 2 319 977 A | 10/1998 | |
| JP | 10-288209 | 10/1992 | |
| JP | 10-071478 | 3/1998 | |
| JP | 10-156556 | 6/1998 | |
| JP | 10-156557 | 6/1998 | |
| JP | 10-166165 | 6/1998 | |
| JP | 10-108467 | 7/1998 | |
| JP | 10-180466 | 7/1998 | |

(List continued on next page.)

*Primary Examiner*—Tom Dunn
*Assistant Examiner*—L. Edmondson
(74) *Attorney, Agent, or Firm*—Cantor Colburn LLP (57) ABSTRACT

An apparatus is provided for joining electrically conductive materials by friction stir welding. The apparatus includes a shaft portion for being received by a rotation imparting apparatus, and a second end having a cut-away portion configured for deflecting plasticized material during friction stir welding. A pilot formed of a material harder than the electrically conductive material extends from the second end. The pilot is configured and dimensioned for friction stir welding electrically conductive members together.

44 Claims, 3 Drawing Sheets

FOREIGN PATENT DOCUMENTS

| | | | |
|---|---|---|---|
| JP | 10-193139 | 7/1998 | |
| JP | 10-193140 | 7/1998 | |
| JP | 10-193143 | 7/1998 | |
| JP | 10-201189 | 7/1998 | |
| JP | 10-202374 | 8/1998 | |
| JP | 10-211591 | 8/1998 | |
| JP | 10-216964 | 8/1998 | |
| JP | 10-225780 | 8/1998 | |
| JP | 10-225781 | 8/1998 | |
| JP | 10-230320 | 9/1998 | |
| JP | 10-230372 | 9/1998 | |
| JP | 10-230373 | 9/1998 | |
| JP | 10-230374 | 9/1998 | |
| JP | 10-230375 | 9/1998 | |
| JP | 10-230376 | 9/1998 | |
| JP | 10-249551 | 9/1998 | |
| JP | 10-249552 | 9/1998 | |
| JP | 10-249553 | 9/1998 | |
| JP | 10-249553 A * | 9/1998 | 228/112.1 |
| JP | 10-249554 | 9/1998 | |
| JP | 10-263852 | 9/1998 | |
| JP | 10-286682 | 10/1998 | |
| JP | 10-291083 | 11/1998 | |
| JP | 10-296462 | 11/1998 | |
| JP | 10-305372 | 11/1998 | |
| JP | 10-305373 | 11/1998 | |
| JP | 10-322984 | 12/1998 | |
| JP | 10-328855 | 12/1998 | |
| JP | 10-328856 | 12/1998 | |
| JP | 11-005179 | 1/1999 | |
| JP | 11-010363 | 1/1999 | |
| JP | 11-010364 | 1/1999 | |
| JP | 11-010365 | 1/1999 | |
| JP | 11-010367 | 1/1999 | |
| JP | 11-010368 | 1/1999 | |
| JP | 11-011160 | 1/1999 | |
| JP | 11-28581 * | 2/1999 | 228/112.1 |
| JP | 11-028581 | 2/1999 | |
| JP | 11-028582 | 2/1999 | |
| JP | 11-028583 | 2/1999 | |
| JP | 11-028584 | 2/1999 | |
| JP | 11-028585 | 2/1999 | |
| JP | 11-033749 | 2/1999 | |
| JP | 11-033750 | 2/1999 | |
| JP | 11-033751 | 2/1999 | |
| JP | 11-047858 | 2/1999 | |
| JP | 11-047859 | 2/1999 | |
| JP | 11-047957 | 2/1999 | |
| JP | 11-047959 | 2/1999 | |
| JP | 11-047960 | 2/1999 | |
| JP | 11-047961 | 2/1999 | |
| JP | 11-048968 | 2/1999 | |
| JP | 11-050180 | 2/1999 | |
| JP | 11-58039 * | 3/1999 | 228/112.1 |
| JP | 11-058036 | 3/1999 | |
| JP | 11-058037 | 3/1999 | |
| JP | 11-058038 | 3/1999 | |
| JP | 11-058039 | 3/1999 | |
| JP | 11-058040 | 3/1999 | |
| JP | 11-059484 | 3/1999 | |
| JP | 11-081656 | 3/1999 | |
| JP | 11-090656 | 4/1999 | |
| JP | 11-101286 | 4/1999 | |
| JP | 11-104860 | 7/1999 | |
| WO | 97/15462 | 5/1997 | |
| WO | 97/48517 | 12/1997 | |
| WO | 98/13167 | 4/1998 | |
| WO | 98/45080 | 10/1998 | |
| WO | 98/51441 | 11/1998 | |
| WO | WO-98/51441 * | 11/1998 | 228/112.1 |
| WO | 98/58759 | 12/1998 | |
| WO | 99/32255 | 7/1999 | |
| WO | 99/33594 | 7/1999 | |
| WO | 99/39861 | 8/1999 | |

* cited by examiner

APPARATUS FOR JOINING ELECTRICALLY CONDUCTIVE MATERIALS

BACKGROUND OF THE INVENTION

The present invention relates to joining conductive materials, and more particularly to an apparatus for joining conductive materials by friction stir welding.

Similar and dissimilar conductive material components, such as bus bars, bus bar joints or bus bar plug-in connection points in electrical busway systems, are joined by conventional welding methods such as gas-metal arc welding (GMAW) or metal inert (MIG) welding. This joining technique causes excess weld metal to form on the bus bar parts, which require additional time and expense for the removal thereof.

Additionally, the GMAW method requires the use of a filler wire. However, filler wire typically has a lower conductivity than the bus bar material, thereby creating a joint that is lower in conductivity & strength than the bus bar joints that are being welded together. This lower conductivity causes the resistivity of the joint to be higher than the original conductive material, which in turn increases the heat dissipated at the joints.

Accordingly, there is a need for an improved apparatus for joining similar or dissimilar conductive materials that minimizes or eliminates conductivity discrepancy between the joint and the original conductive material. Additionally, there is a need for an apparatus that will join similar or dissimilar conductive materials without producing excess weld metal.

SUMMARY OF THE INVENTION

An apparatus is provided for joining electrically conductive materials by friction stir welding. The apparatus includes a shaft portion for being received by a rotation imparting apparatus, such as a power drill. The shaft portion also includes a second end having a cut-away portion configured for deflecting plasticized material during friction stir welding. A pilot extends from the second end formed of a material harder than said electrically conductive material. The pilot is configured and dimensioned for friction stir welding electrically conductive members together.

During operation, the apparatus is rotated while the pilot is inserted in a joint between electrically conductive members. While rotating, the apparatus is translated across the joint. A strong, low resistance friction stir weld is formed between the electrically conductive members.

The above discussed and other features and advantages of the present invention will be appreciated and understood by those skilled in the art from the following detailed description and drawings.

The Figures are meant to further illustrate the present invention and not to limit the scope thereof.

DETAILED DESCRIPTION OF THE INVENTION

Figure 1:
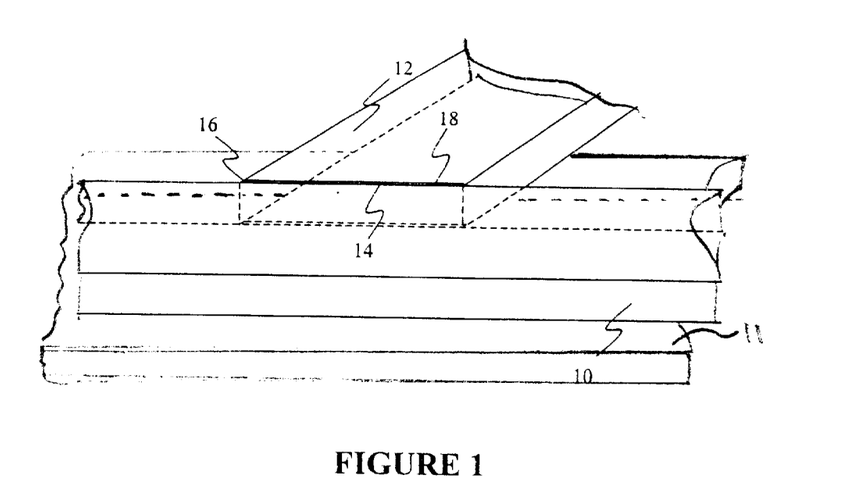
FIG. 1 is a front perspective view of an arrangement bus bars positioned for welding according to an embodiment of the present invention.

In an exemplary embodiment, conductors 10 and 12 are shown in FIG. 1. Conductors 10 and 12 are positioned together on a baseplate or fixture 11 in a T formation, for example, as an arrangement of a bus bar in a bus bar runway (i.e., bus bar 10) and a termination lead (i.e., lead 12) to a power consuming device or power distribution center (not shown). However, in addition to a T-joint between a bus bar and a lead, it is contemplated that the technique described herein may be applied to a butt joint, an L shaped joint, or a miter joint between a bus bar and a termination lead; a T joint, a butt joint, an L shaped joint, or a miter joint between a bus bar and a bus bar, or a T joint, a butt joint, an L shaped joint, or a miter joint between a termination lead and a termination lead. Furthermore, the technique may be employed to repair cracks in conductors, for example, at existing GMAW joints.

An end 14 of lead 12 is positioned so that it is adjacent to an edge portion 16 of bus bar 10 to form a joint 18. Lead 12 is positioned against bus bar 10 to maintain the desired positioning of the between end 14 and edge portion 16. It is contemplated that lead 12 need not be forced tightly against bus bar 10. In one exemplary embodiment, a small distance (e.g., up to about 10% of the thickness of the thinner of bus bar 10 or lead 12) is maintained between end 14 and edge portion 16. Additionally, end 14 and edge portion 16 can be square (as shown), or can be rounded or beveled.

Bus bar 10 and lead 12 are formed of similar electrical grade conducting material, such as copper, copper alloys, aluminum, or aluminum alloys. Alternatively, bus bar 10 and lead 12 can be formed of dissimilar conducting materials, such as, for example, where bus bar 10 is aluminum and lead 12 is copper. The dimensions of bus bar 10 and lead 12 can vary. Generally, in an industrial application, for example, a series of bus bars traverse a site, wherein each bus bar corresponds with one phase of power in a multiple phase power system. Termination leads are attached to the bus bars to distribute the power to a load. For such applications, bus bars and leads have a thickness typically between about 0.0625 in. (1.5875 millimeters, mm) and about 1 in. (2.54 centimeters, cm), preferably between about 0.125 in. (0.3175 cm) and about 0.75 in. (1.905 cm), and most preferably between about 0.1875 in. (0.47625 cm) and about 0.3125 in. (0.79375 cm); a width between about 0.5 in. (1.27 cm) and about 12 in. (30.48 cm), preferably about 1.5 in. (3.81 cm) and about 9 in. (22.86 cm), and most preferably between about 1.625 in. (4.1275 cm) and about 8.25 in. (20.955 cm); and an appropriate length depending, for example, on the positioning of loads and power sources.

Figure 2:
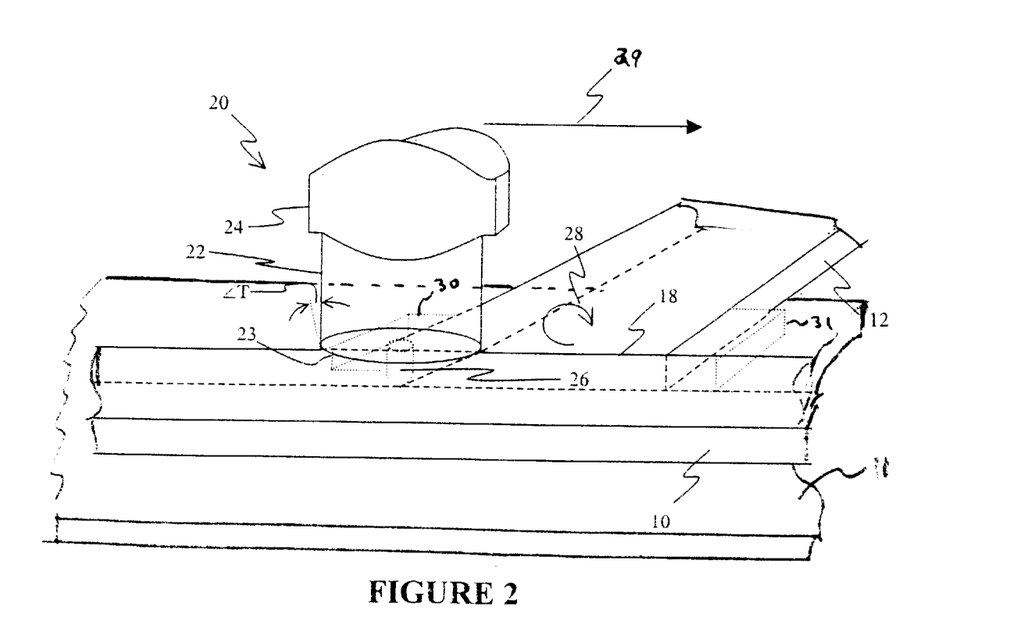
FIG. 2 is a front perspective view of the arrangement of FIG. 1 including a friction stir welding apparatus positioned according to an embodiment of the present invention.

Referring now to FIG. 2, an apparatus 20 is provided for friction stir welding of bus bars 10 and 12. Apparatus 20 includes a cylindrical body 22 having an upper portion 24 being connected to a power source (not shown), for example an electric motor, and a pilot 26 attached to cylindrical body 22.

Cylindrical body 22 includes an end 23. End 23 can be of various shapes, including but not limited to flat, cup shaped, concave, conical, or frusto-conical. It is contemplated that apparatus 20 can cause pilot 26 to rotate using different power sources or configurations. For example, upper portion 24 may be at a right angle to cylindrical body 22. Also, the power source may cause both cylindrical body 22 and pilot 26 to rotate. Alternatively, the power source may cause only pilot 26 to rotate.

Pilot 26 and cylindrical body 22 are formed from materials harder than the material forming conductive members 10 and 12. For example, where bus bar 10 and lead 12 are formed of copper or aluminum, pilot 26 and cylindrical body 22 can be formed of materials including steel, high carbon content steel, stainless steel copper, cobalt, nickel, chromium, tantalum, titanium, tungsten, molybdenum, silicon, manganese, carbon, or any alloy or processed form of any of the foregoing materials such as Inconel® 718, Monel™ 100M, Tungsten 100W, and 304 Nickel.

Pilot 26 extends from cylindrical body 22 such that pilot 26 is caused to rotate by the power source, either in the clockwise or counterclockwise directions, the clockwise direction (generally as indicated by arrow 28). To facilitate the friction stir welding described herein, pilot 26 is rotated at speeds between 500 and 6000 revolutions per minute (RPM), preferably between 1000 and 4000 RPM, and most preferably between 1200 and 1600 RPM. Of course, it is contemplated that the rotational speed of pilot 26 may vary depending on factors including, but not limited to, the translational speed of pilot 26 across joint 18, the materials of conductors 10 and 12, and other optimization factors.

The dimensions of pilot 26 depends on the cross sectional dimensions of bus bar 10 and lead 12. For example, in the industrial setting described above, pilot 26 can have a diameter between about 0.2 in. (0.51 cm) and about 0.35 in (0.89 cm) and sufficiently long to protrude to, but not beyond, the thickness of the bus bar 10 and lead 12 (e.g., typically between about 0.0625 in. (1.5875 mm) and about 1 in. (2.54 cm)). By limiting the protrusion into bus bar 10 and lead 12, a clean under surface (i.e., opposite the surface from which pilot 26 is introduced) results since the disturbance of the material proximate the under surface at the joint is minimized. Further, extension of pilot 26 beyond the thickness of bus bar 10 and lead 12 would cut into fixture 11.

Figure 3:
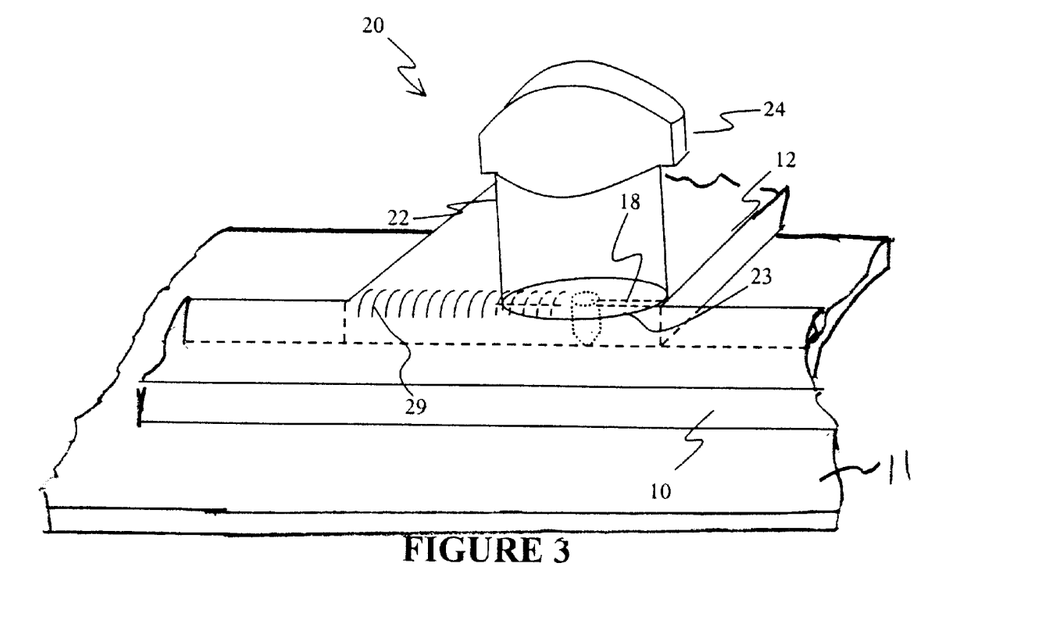
FIG. 3 is a front perspective view of the arrangement of FIGS. 1 and 2 including the bus bars partially welded together.
Figure 4:
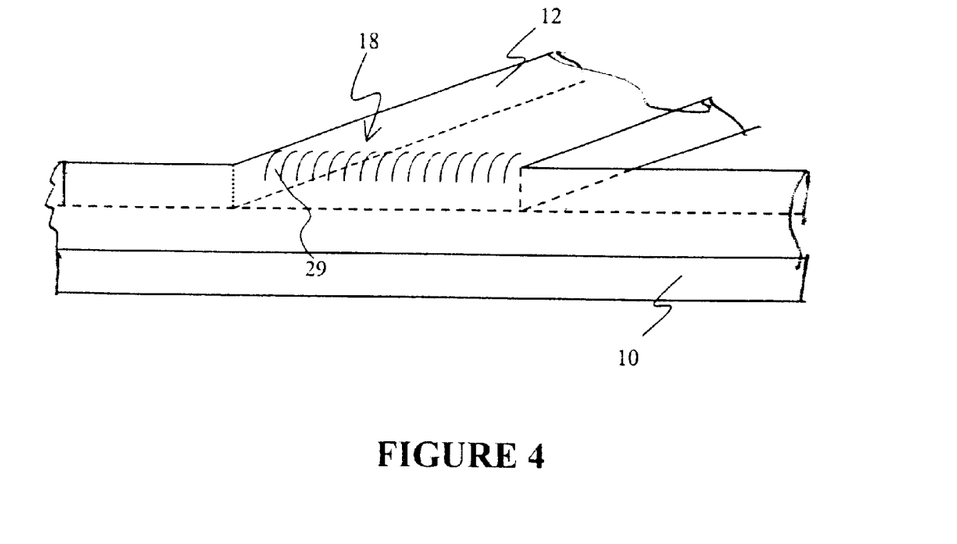
FIG. 4 is a front perspective view of the arrangement of FIGS. 1–3 including the bus bars completely welded together.

Furthermore, the shape of pilot 26 can vary. In FIGS. 2–4, pilot 26 is generally depicted as having a blunt pointed tip. However, the body of pilot 26 can be various shapes including, but not limited to, cylindrical, conical, frustoconical, and can include a sharp pointed, flat, blunt pointed, or otherwise rounded tip. Pilot 26 is threaded generally to increase friction between pilot 26 and the materials in the joint. It is contemplated that other configurations, such as a fluted configuration, may be used in place of the threaded configuration.

Pilot 26 is arranged on joint 18 generally at one end thereof, as shown in FIG. 2. While pilot 26 is rotating, apparatus 20 is translated generally the direction indicated by arrow 29 (which direction will vary depending on the initial positioning of pilot 26) into and along joint 18. While the speed that apparatus 20 is translated across joint 18 may vary, in the industrial setting described above, speeds are approximately 1 in. (2.54 cm) per min. to 100 in. (254 cm) per min., preferably 3 in. (7.62 cm) per min. to 60 in. (152 cm) per min., and most preferably 30 in. (76.2 cm) per min. to 50 in. (127 cm) per min. It is contemplated, of course, that pilot 26 can be plunged into any point along joint 18 and translated in either direction along joint 18. If it is required that joint 18 be completely sealed, then pilot 26 must be translated through the remaining portion of joint 18, and may require the use of a run-on tab 30 (shown by phantom lines) and/or a run-off tab 31 (shown by phantom lines). Run-on tab 30 and run-off tab 31 are generally of materials suitable for friction stir welding (i.e., having a hardness less than that of pilot 26) and prevent the weld pool from spilling out of joint 18. Furthermore, to facilitate plunging of pilot 26 into joint 18, a pilot hole may be formed at a point upon joint 18 for the initial plunge.

In another exemplary embodiment, apparatus 20 is tilted generally away from the direction of travel, as indicated by a dashed line and an angle T (generally representing the angle between the centerline axis of pilot 26 and an imaginary line perpendicular to the surface of conductors 10, 12). Generally, angle T is between about 0° and about 8°. FIG. 3 also represents the tilt of apparatus 20. Alternatively, the parts to be welded may be positioned at angle T.

Referring now to FIGS. 3 and 4, as the rotating pilot 26 is translated through joint 18, a local region of highly plasticized material is produced around pilot 26. The material is from both bus bar 10 and lead 12.

Some of the plasticized material is thrown into edge 23 and is forced back into joint 18. If edge 23 is cupped, concave, conical, or frustoconical, pilot 26 can be translated across joint 18 at higher rates of speed than if edge 23 were flat because plasticized material will not cause pilot 26 to slow down or seize. Furthermore, in one exemplary embodiment, with the inclusion of a tilt having an angle T, deflection of plasticized material off of edge 23 and back into joint 18 is facilitated. Additionally, as described above, by providing pilot 26 having a protrusion less than the thickness of bus bar 10 and lead 12 (and accounting for the tilt angle T, if any), build-up of plasticized material proximate to the under surface of joint 18 (i.e., opposite the surface that pilot 26 is introduced) is minimized or eliminated.

By translating apparatus 20 as described above, the regions of joint 18 that have been traversed by the rotating pilot 26 solidifies (as indicated by a plurality of curved lines 29), and conductive members 10 and 12 are attached together. Because no filler is used to attach the conductors, the conductivity between conductors 10 and 12 is minimally effected by joint 18. The conductivity differential due to the weld is generally less than 5%, preferably less than 2%, and most preferably less than 1%.

Furthermore the heat affected zone conventionally found in welded busway distribution systems is eliminated or minimized. Accordingly, no secondary operation (e.g., machining or annealing), or minimal secondary operation, is required to finish the weld joint created by the methods of the present invention.

The strength of joint 18 is at least as strong as, if not stronger, than conventional welds. For example, bus bars 0.25 inches thick and between 1.625 in. (4.1275 cm) and 8.25 in. (20.955 cm) were joined by a friction stir apparatus rotating a pilot between 1200 and 1600 RPM and translating 30 in. (76.2 cm) per min. to 50 in. (127 cm) per min. A 180° bend test demonstrated no cracking or breakage at the weld joint.

Figure 5:
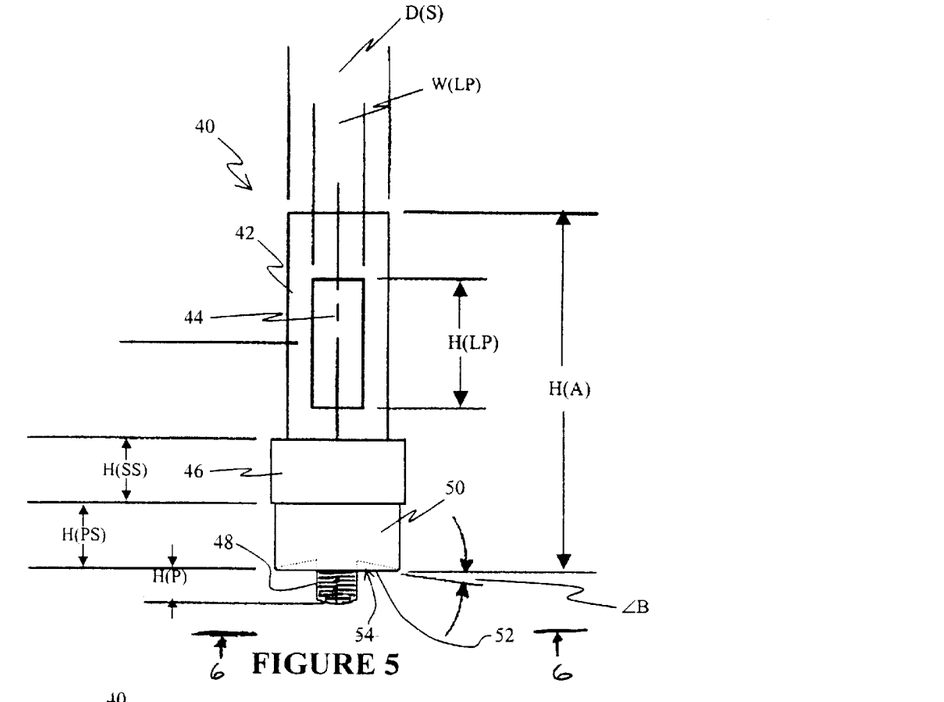
FIG. 5 is a front plan view of an embodiment of an apparatus for joining conductive members.
Figure 6:
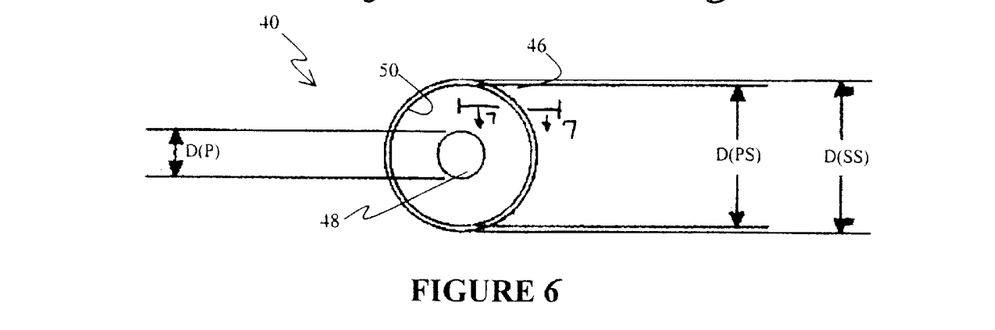
FIG. 6 is a view across lines 6—6 of FIG. 5.
Figure 7:
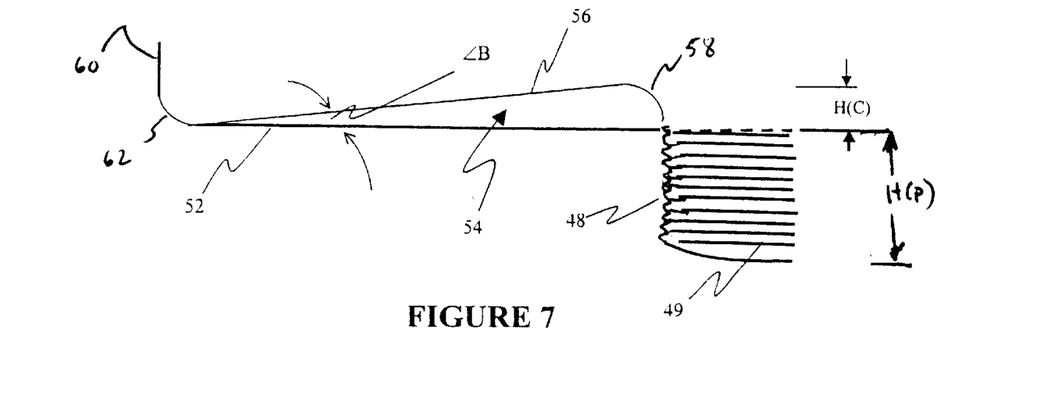
FIG. 7 is an enlarged partial sectional view across 7—7 of FIG. 6.

Referring now to FIGS. 5–7, an apparatus 40 for friction stir welding a joint between electrically conductive members is shown. Apparatus 40 is an example of apparatus 20 generally described above with reference to FIGS. 1–4.

Apparatus 40 is configured and dimensioned for use in a rotation imparting apparatus (not shown) capable of rotating apparatus 40 at speeds generally between about 500 and 6000 RPM, although it is contemplated that apparatus 40 may be integral with a rotation imparting apparatus. In one exemplary embodiment, apparatus 40 is configured with a shaft portion 42 having one or more locking portions 44. A shaft shoulder 46 is dimensioned and configured below shaft 42 generally for maintaining the rotation imparting apparatus.

A pilot 48 (e.g., similar to pilot 26 described above) extends from a pilot shoulder 50. It is contemplated that shaft shoulder 46 and pilot shoulder 50 may have the same diameter, thus forming a single shoulder (not shown). The diameter of pilot shoulder 50 is generally commensurate with the application, wherein diameters of between about 0.7 in. (1.78 cm) and 1.1 in. (2.79 cm) are suitable for pilots having diameters between about 0.2 in. (0.51 cm) and about 0.35 in. (0.89 cm).

Generally, pilot 48 protrudes sufficiently beyond an edge 52 of pilot shoulder 50 such that pilot 48 extends into a joint between two members to be friction stir welded, as described above particularly with reference to FIGS. 2 and 3. Pilot 48 also includes a plurality threads 49 to facilitate friction generation when pilot 48 is rotated.

Apparatus 40 can be manufactured by various methods, including machining, casting, or assembly of discreet components. In one exemplary embodiment, apparatus 40 is machined from a solid material including steel, high carbon content steel, copper, cobalt, nickel, chromium, tantalum, titanium, tungsten, molybdenum, silicon, manganese, carbon, or any alloy or processed form of any of the foregoing materials such as Inconel® 718, Monel™ 100M, Tungsten 100W, and 304 Nickel.

Pilot shoulder 52 is configured with a cut-away portion 54. Cut-away portion 54 is generally conical in shape and formed by sloped portions 56. Sloped portions 56 generally are at an angle B with respect to edge 52. Generally, angle B is between about 0° (i.e., no cut-away shape) and about 20°, preferably between about 0.5° and about 16°, and most preferably between about 5° and about 11°. Pilot 48 extends from the center, cut -away portion 54. Alternativelly, cut-away portion 54 may be cup shaped, (e.g., with substantially vertical or steep pitched wall and a substantially horizontal roof) conical, frustoconical, or concave.

At the inside corner of sloped portion 56 and pilot 48, a fillet 58 is formed, which enhances overall strength of apparatus 40. Further, at the outside corner of sloped portion 56 and pilot shoulder 50, is on edge 60 having a fillet 62, again to enhance over strength, and also to facilitate placement of appropriate 40 or the workpieces at an angle T, described above with respect to FIGS. 2 and 3.

The invention is further illustrated by the following non-limiting examples.

EXAMPLE 1

In one example of apparatus 40, and with continuing reference to FIGS. 5–7, shaft 42 is configured and dimensioned for placement in a drill having a ¾ inch chuck as the rotation imparting apparatus. Apparatus 40 has an overall height H(A) of about 2.75 in. (6.985 cm). Shaft 42 has a diameter D(S) of about 0.748 in. (1.89 cm), wherein D(S) has a tolerance of −0.001 in. (0.0254 mm). Locking portion 44 has a width (flat) W(LP) of about 0.375 in. (0.952 cm) and a height H(LP) of about 1 in. (2.54 cm), which correspond to lock protrusions within a conventional ¾ inch chuck. Furthermore, shaft shoulder 46 has a height H(SS) of about 0.5 in. (1.27 cm) and a diameter D(SS) of about 1 in (2.54 cm), and pilot shoulder 50 has a height H(PS) of about 0.5 in. (1.27 cm) and a diameter D(PS) of about 0.93 in (2.36 cm).

Cut-away portion 54 is conical in shape, wherein angle B of sloped portion 56 is about 8° and the distance H(C) is generally the height of the conical portion (i.e., measured between the deepest portion of cut-away portion 54 and edge 52) is about 0.0436 in (1.1 mm). Fillet 58 between sloped portion 56 and pilot 48 has a radius of about 0.050 in (1.27 mm), and fillet 60 between sloped portion 56 and edge 60 has a radius of about 0.050 in (1.27 mm).

Pilot 48 has a diameter D(P) of about 0.31 in. (0.787 cm), wherein D(P) has a tolerance of +/−0.001 in. (0.0254 mm) and includes a plurality of threads 49 as generally described above, having a ⁵⁄₁₆ inch diameter right hand thread cut therein spaced apart at 18 threads per inch. Threads 49 are provided on pilot 48 up to the point where fillet 58 commences, generally to minimize the creation of notches that may degrade the strength of apparatus 40.

Pilot 48 extends beyond edge 52 a distance H(P), which is about 0.246 in (0.6248 cm) for conductors having a thickness of about 0.25 in. (0.635 cm).

In operation, while apparatus 40 is traversed across a joint to be friction stir welded, apparatus 40 is tilted such that angle T (described above with reference to FIG. 2) is between about 1° and 5°, and preferably about 3°.

The embodiment of apparatus 40 described with respect to Example 1 is particularly suitable for friction stir welding conductors formed of conductive materials including aluminum, copper, and alloys of the foregoing conductive materials, particularly conductors having a thickness of 0.25 inches (0.635 cm). Additionally, the apparatus of Example 1 is suitable for rotational speeds of between about 1000 and 1500 RPM, and translational speeds between about 10 in. (25.4 cm) per min. to 50 in. (127 cm) per min.

EXAMPLE 2

In another example of apparatus 40, and again with reference to FIGS. 5–7, shaft 42 is configured and dimensioned as in Example 1. Shaft shoulder 46 has a height H(SS) of about 0.5 in. (1.27 cm) and a diameter D(SS) of about 1 in (2.54 cm), and pilot shoulder 50 has a height H(PS) of about 0.5 in. (1.27 cm) and a diameter D(PS) of about 0.75 in (1.9 cm).

Cut-away portion 54 is conical in shape, wherein angle B of sloped portion 56 is about 8° and the distance H(C) is generally the height of the conical portion (i.e., measured between the deepest portion of cut-away portion 54 and edge 52) is about 0.035 in (0.89 mm). Fillet 58 between sloped portion 56 and pilot 48 has a radius of about 0.050 in (1.27 mm), and fillet 60 between sloped portion 56 and edge 60 has a radius of about 0.050 in (1.27 mm).

Pilot 48 has a diameter D(P) of about 0.25 in. (0.787 cm), wherein D(P) has a tolerance of +/−0.001 in. (0.0254 mm), and includes a plurality of threads 49 as generally described above, having a ⁹⁄₃₂ inch diameter right hand thread cut therein spaced apart at 20 threads per inch. As in Example 1, threads 49 are provided on pilot 48 up to the point where fillet 58 commences, and pilot 48 extends beyond edge 52 a distance H(P), which is about 0.246 in (0.6248 cm) (configured for conductors having a thickness of about 0.25 in. (0.635 cm).

In operation, apparatus 40 is tilted an angle T (as described above with reference to Example 1 and also with reference to FIG. 2), which is between about 1° and 5°, and preferably about 3°.

The embodiment of apparatus 40 described with respect to Example 2 is particularly suitable for friction stir welding conductors formed of conductive materials including aluminum, copper, and alloys of the foregoing conductive materials, particularly conductors having a thickness of 0.25 inches (0.635 cm). Additionally, the apparatus of Example 2 is suitable for rotational speeds of between about 1000 and 1500 RPM, and translational speeds between about 10 in. (25.4 cm) per min. to 50 in. (127 cm) per min.

By translating apparatus 40 as described above, the regions of a joint that have been traversed by the rotating pilot 48 solidifies as described above with respect to FIGS. 1–4 and a pair of electrically conductive members are joined together by friction stir welding. The heat affected zone conventionally found in welded busway distribution systems was minimized as compared to conductors joined with metal inert welding. No secondary operation (e.g., machining or annealing) was required to finish the weld joint created by the friction stir welding process using the tools of Example 1 and 2. However, weld joints formed by friction stir welding tools not configured and dimensioned for electrically conductive members (e.g., having larger pilot diameters than described and claimed herein), or weld joints formed by metal inert gas welding, resulted in an increased heat affected zone, generally requiring annealing. The annealing step results in a joint that has been softened, then hardened, and in the softening, placement and angular relationships were lost.

Additionally, the strength of a friction stir weld joint was at east as strong as, if not stronger, than conventional welds. For example, bus bars 0.25 in. (0.635 cm) thick and between 1.625 in. (4.1275 cm) and 8.25 in. (20.955 cm) wide were joined by a friction stir apparatus rotating a pilot between about 1200 and about 1600 RPM and translating at speeds between about 30 in. (76.2 cm) per min. to about 50 in. (127 cm) per min. A 180° bend test (wherein electrically conductive members were welded with the apparatuses of Examples 1 and 2 was bent 180° over a mandrel having a diameter of 1.25 in. (3.175 cm)) demonstrated no cracking or breakage at the weld joint. However, the same test performed with identical electrically conductive members welded together by metal inert gas welding demonstrated cracks at the weld joint.

Furthermore, because no filler was used to attach the conductors, the conductivity between conductors was minimally effected by the friction stir weld. In the case of welding members that are about 0.25 in. (0.635 cm) thick, the conductivity differential due to the weld was minimized.

While the invention has been described with reference to a preferred embodiment and various alternative embodiments, it will be understood by those skilled in the art that changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for joining electrically conductive materials by friction stir welding comprising:
   a shaft portion having a first end configured and dimensioned for being received by a rotation imparting apparatus, and a second end having a cut-away portion configured for deflecting plasticized material during friction stir welding;
   a pilot formed of a material harder than said electrically conductive material extending from said second end, said pilot being configured and dimensioned for friction stir welding a first electrically conductive member and a second electrically conductive member; and
   wherein said pilot has a diameter between about 0.2 inches and 0.35 inches and is configured with a 5/16 inch right handed thread, and said cut-away portion is formed of a sloped portion having a slope of about 8° extending substantially from a corner edge of said second end to a base of said pilot.

2. An apparatus as in claim 1, wherein an inside corner between a base of said pilot and said sloped portion is filleted.

3. An apparatus as in claim 1, further comprising a pilot shoulder at said second end, wherein an outside corner between said pilot shoulder and said sloped portion is filleted.

4. An apparatus as in claim 1, wherein said first electrically conductive member is about 0.25 inches thick, and a portion to be friction stir welded has a space between said first electrically conductive member and said second electrically conductive member that is less than about 10% of the thickness of said first electrically conducting member, further wherein said second end has a diameter of between about 0.7 inches and about 1.1 inches.

5. An apparatus as in claim 1, wherein said pilot has a diameter of about 0.31 inches and further wherein said second end has a diameter of about 0.93 inches.

6. An apparatus as in claim 5, wherein an inside corner between a base of said pilot and said sloped portion is filleted at a radius of about 0.05 inches, wherein said thread ceases at the location where said radius commences.

7. An apparatus as in claim 6, further comprising a pilot shoulder at said second end, wherein an outside corner between said pilot shoulder and said sloped portion is filleted at a radius of about 0.05 inches.

8. An apparatus as in claim 1, wherein said pilot has a diameter of about 0.25 inches and further wherein said second end has a diameter of about 0.75 inches.

9. An a apparatus as in claim 8, wherein an inside corner between a base of said pilot and said sloped portion is filleted at a radius of about 0.05 inches.

10. An apparatus as in claim 9, further comprising a pilot shoulder at said second end, wherein an outside corner between said pilot shoulder and said sloped portion is filleted at a radius of about 0.05 inches, wherein said threaded ceases at the location where said radius commences.

11. An apparatus as in claim 1, wherein said shaft portion and said pilot are machined or cast such that said apparatus is an integral tool.

12. An apparatus as in claim 1, wherein said pilot is threaded.

13. An apparatus as in claim 1, wherein said pilot extends from a center of said cut-away portion, and further wherein said cut-away portion is frustoconical.

14. An apparatus for joining electrically conductive materials by friction stir welding comprising:
   a shaft portion having a first end configured and dimensioned for being received by a rotation imparting apparatus, and a second end having a cut-away portion configured for deflecting plasticized material during friction stir welding;
   a pilot formed of a material harder than said electrically conductive material extending from said second end, said pilot being configured and dimensioned for friction stir welding a first electrically conductive member and a second electrically conductive member; and wherein said pilot has a diameter about 0.31 inches, and said cut-away portion is formed of a sloped portion having a slope of between about 0.5° and about 20° extending substantially from a corner edge of said second end to a base of said pilot.

15. An apparatus as in claim 14, wherein said sloped portion has a slope of about 8°.

16. A apparatus as in claim 15, wherein an inside corner between a base of said pilot and said sloped portion is filleted at a radius of about 0.05 inches.

17. An apparatus as in claim 16, further comprising a pilot shoulder at said second end, wherein an outside corner between said pilot shoulder and said sloped portion is filleted at a radius of about 0.05 inches, wherein said thread ceases at the location where said radius commences.

18. An apparatus as in claim 14, wherein said pilot is threaded.

19. An apparatus as in claim 14, wherein said pilot extends from a center of said cut-away portion, and further wherein said cut-away portion is frustoconical.

20. An apparatus for joining electrically conductive materials by friction stir welding comprising:

a shaft portion having a first end configured and dimensioned for being received by a rotation imparting apparatus, and a second end having a cut-away portion configured for deflecting plasticized material during friction stir welding;

a pilot formed of a material harder than said electrically conductive material extending from said second end, said pilot being configured and dimensioned for friction stir welding a first electrically conductive member and a second electrically conductive member; and wherein said pilot has a diameter about 0.25 inches and is configured with a 5/16 inch right handed thread, and said cut-away portion is formed of a sloped portion having a slope of between about 0.5° and about 20° extending substantially from a corner edge of said second end to a base of said pilot.

21. An apparatus as in claim 20, wherein said sloped portion has a slope of about 8°.

22. An apparatus as in claim 21, wherein an inside corner between a base of said pilot and said sloped portion is filleted at a radius of about 0.05 inches.

23. An apparatus as in claim 22, further comprising a pilot shoulder at said second end, wherein an outside corner between said pilot shoulder and said sloped portion is filleted at a radius of about 0.05 inches, wherein said thread ceases at the location where said radius commences.

24. An apparatus as in claim 20, wherein said pilot is threaded.

25. An apparatus as in claim 20, wherein said pilot extends from a center of said cut-away portion, and further wherein said cut-away portion is frustoconical.

26. An apparatus for joining electrically conductive materials by friction stir welding comprising:

a shaft portion having a first end configured and dimensioned for being received by a rotation imparting apparatus, and a second end having a cut-away portion configured for deflecting plasticized material during friction stir welding;

a pilot formed of a material harder than said electrically conductive material extending from said second end, said pilot being configured and dimensioned for friction stir welding a first electrically conductive member and a second electrically conductive member; and wherein said pilot has a diameter between about 0.2 inches and 0.35 inches and is configured with a 9/32 inch right handed thread, and said cut-away portion is formed of a sloped portion having a slope of about 8° extending substantially from a corner edge of said second end to a base of said pilot.

27. An apparatus as in claim 26, wherein an inside corner between a base of said pilot and said sloped portion is filleted.

28. An apparatus as in claim 26, further comprising a pilot shoulder at said second end, wherein an outside corner between said pilot shoulder and said sloped portion is filleted.

29. An apparatus as in claim 26, wherein said first electrically conductive member is about 0.25 inches thick, and a portion to be friction stir welded has a space between said first electrically conductive member and said second electrically conductive member that is less than about 10% of the thickness of said first electrically conducting member, further wherein said second end has a diameter of between about 0.7 inches and about 1.1 inches.

30. An apparatus as in claim 26, wherein said pilot has a diameter of about 0.31 inches and further wherein said second end has a diameter of about 0.93 inches.

31. An apparatus as in claim 30, wherein an inside corner between a base of said pilot and said sloped portion is filleted at a radius of about 0.05 inches, wherein said thread ceases at the location where said radius commences.

32. An apparatus as in claim 31, further comprising a pilot shoulder at said second end, wherein an outside corner between said pilot shoulder and said sloped portion is filleted at a radius of about 0.05 inches.

33. An apparatus as in claim 26, wherein said pilot has a diameter of about 0.25 inches and further wherein said second end has a diameter of about 0.75 inches.

34. An apparatus as in claim 33, wherein an inside corner between a base of said pilot and said sloped portion is filleted at a radius of about 0.05 inches.

35. An apparatus as in claim 34, further comprising a pilot shoulder at said second end, wherein an outside corner between said pilot shoulder and said sloped portion is filleted at a radius of about 0.05 inches, wherein said thread ceases at the location where said radius commences.

36. An apparatus as in claim 26, wherein said shaft portion and said pilot are machined or cast such that said apparatus is an integral tool.

37. An apparatus as in claim 26, wherein said pilot is threaded.

38. An apparatus as in claim 26, wherein said pilot extends from a center of said cut-away portion, and further wherein said cut-away portion is frustoconical.

39. An apparatus for joining electrically conductive materials by friction stir welding comprising:

a shaft portion having a first end configured and dimensioned for being received by a rotation imparting apparatus, and a second end having a cut-away portion configured for deflecting plasticized material during friction stir welding;

a pilot formed of a material harder than said electrically conductive material extending from said second end, said pilot being configured and dimensioned for friction stir welding a first electrically conductive member and a second electrically conductive member; and wherein said pilot has a diameter about 0.25 inches and is configured with a 9/32 inch right handed thread, and said cut-away portion is formed of a sloped portion having a slope of between about 0.5° and about 20° extending substantially from a corner edge of said second end to a base of said pilot.

40. An apparatus as in claim 39, wherein said sloped portion has a slope of about 8°.

41. An apparatus as in claim 40, wherein an inside corner between a base of said pilot and said sloped portion is filleted at a radius of about 0.05 inches.

42. An apparatus as in claim 41, further comprising a pilot shoulder at said second end, wherein an outside corner between said pilot shoulder and said sloped portion is filleted at a radius of about 0.05 inches, wherein said thread ceases at the location where said radius commences.

43. An apparatus as in claim 39, wherein said pilot is threaded.

44. An apparatus as in claim 39, wherein said pilot extends from a center of said cut-away portion, and further wherein said cut-away portion is frustoconical.

* * * * *